(12) United States Patent
Ma et al.

(10) Patent No.: US 9,866,659 B2
(45) Date of Patent: *Jan. 9, 2018

(54) WATERPROOF PRESSKEY STRUCTURE AND WATERPROOF MOBILE PHONE UTILIZING SAME

(71) Applicant: Power Idea Technology (Shenzhen) Co., Ltd., Shenzhen (CN)

(72) Inventors: Ji-Dong Ma, Shenzhen (CN); Dong-Ming Chen, Shenzhen (CN)

(73) Assignee: Power Idea Technology (Shenzhen) Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/347,810

(22) Filed: Nov. 10, 2016

(65) Prior Publication Data

US 2017/0064053 A1    Mar. 2, 2017

Related U.S. Application Data

(63) Continuation of application No. PCT/CN2014/083099, filed on Jul. 26, 2014.

(51) Int. Cl.

| H04M 1/00 | (2006.01) |
|---|---|
| H04M 1/02 | (2006.01) |
| H01H 13/06 | (2006.01) |
| H01H 13/14 | (2006.01) |
| H04B 1/3888 | (2015.01) |
| H01H 13/86 | (2006.01) |
| H04B 1/38 | (2015.01) |

(52) U.S. Cl.
CPC .......... *H04M 1/0249* (2013.01); *H01H 13/06* (2013.01); *H01H 13/14* (2013.01); *H01H 13/86* (2013.01); *H04B 1/3888* (2013.01); *H04M 1/02* (2013.01); *H01H 2013/066* (2013.01); *H01H 2223/002* (2013.01); *H01H 2231/022* (2013.01); *H04B 2001/3894* (2013.01)

(58) Field of Classification Search
CPC ...... H04M 1/0249; H04M 1/02; H01H 13/06; H01H 13/14; H01H 13/86; H01H 2013/066; H01H 2223/002; H01H 2231/022; H04B 1/3888
USPC .......................... 455/575.1, 575.3, 550.1, 347
See application file for complete search history.

(56) References Cited

U.S. PATENT DOCUMENTS

| 4,170,104 A | 10/1979 | Yamagata | |
|---|---|---|---|
| 5,939,690 A * | 8/1999 | Yasui | H01H 13/06 200/302.2 |
| 6,561,815 B1 * | 5/2003 | Schmidt | H01R 13/7037 439/38 |

(Continued)

*Primary Examiner* — Dominic Rego
(74) *Attorney, Agent, or Firm* — ScienBiziP, P.C.

(57) ABSTRACT

A waterproof presskey structure includes a shell, a button or presskey, and an elastic element. The elastic element and the shell can be assembled together with gum, the presskey is movably assembled to the shell and matches with the elastic element. The elastic element comprises a tubular structure having an elastic wall. The elastic wall is arched, and the elastic wall projects out towards within the tubular structure. For the arched elastic wall stretches under pressure from the button or presskey, an assembly of the elastic element and other parts is not affected, the elastic element cannot be separated from the shell due to the gum failing, and water resistance between the presskey and the shell is increased.

22 Claims, 8 Drawing Sheets

(56) References Cited

U.S. PATENT DOCUMENTS

| | | | |
|---|---|---|---|
| 2010/0072046 A1* | 3/2010 | Maeda | H01H 13/06 200/302.2 |
| 2011/0155550 A1* | 6/2011 | Ouyang | H01H 13/7073 200/345 |
| 2012/0227251 A1* | 9/2012 | Hyuga | B29C 45/14467 29/622 |
| 2014/0233360 A1* | 8/2014 | Koshoji | G04B 37/106 368/290 |
| 2015/0092341 A1* | 4/2015 | Liu | G06F 1/187 361/679.39 |
| 2015/0136290 A1* | 5/2015 | Kim | B29D 30/02 152/246 |
| 2015/0221460 A1* | 8/2015 | Teplitxky | H01H 13/06 200/302.2 |

* cited by examiner

WATERPROOF PRESSKEY STRUCTURE AND WATERPROOF MOBILE PHONE UTILIZING SAME

FIELD

The subject matter herein generally relates to waterproof structures of electronic devices, and particularly, to a waterproof presskey structure of mobile phone.

BACKGROUND

Figure 1:
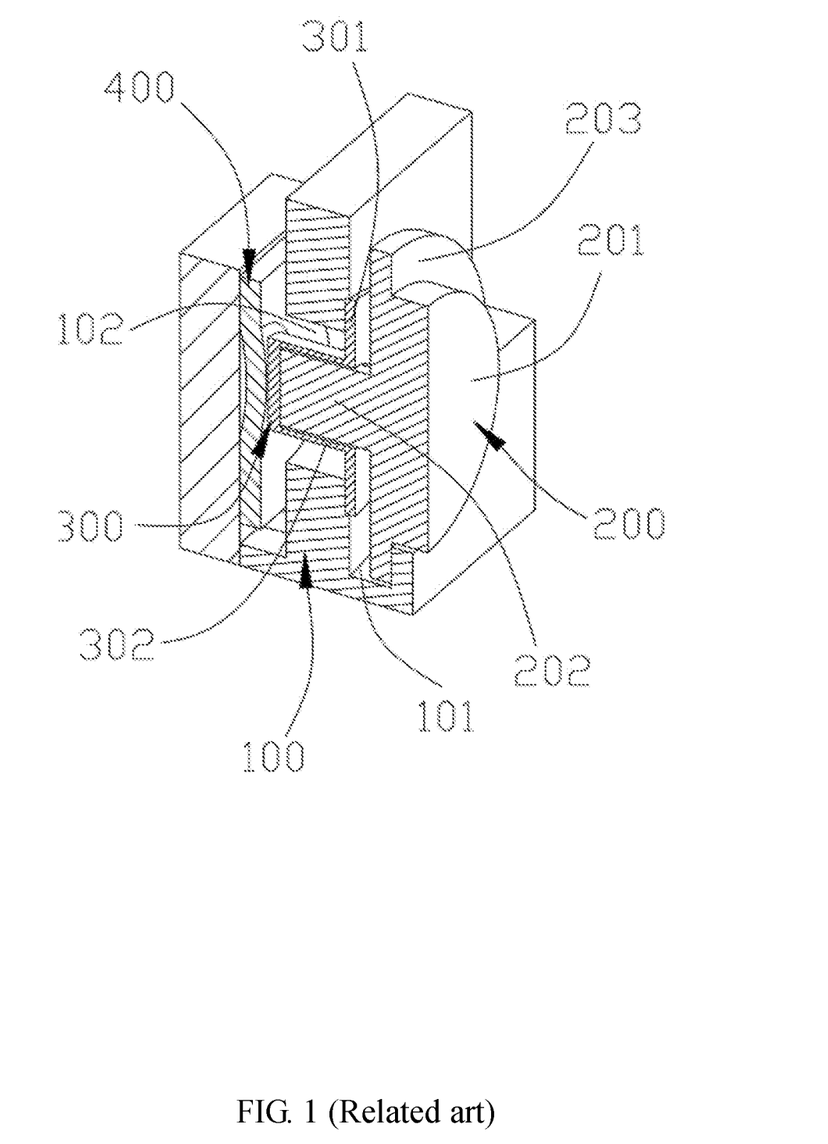
FIG. 1 is a schematic view of a presskey structure of related art.

Outdoor electronic devices must withstand outdoor environment, and thus be waterproof. Presskeys or buttons of electronic devices are generally installed in a limited space and move to input characters or commands, that waterproofing is made more difficult. FIG. 1 shows a waterproof presskey structure which includes a shell 100, a presskey 200, a silicone element 300, and a switch 400. The presskey 200 includes a key cap 201 and a post 202. A shoulder 203 extends from the key cap 201 and surrounds the key cap 201. The shoulder 203 is received in a slot 101 defined in the shell 100 and movable in the slot 101 along the direction of pressing/releasing the presskey 200. A width of the slot 101 along the direction of pressing/releasing the presskey 200 defines a maximum distance of travel, that is, the presskey 200 being pressed down or springing back up. The silicone member 300 is shaped as a hat and includes a body 302 and a flange 301. The body 302 is received in a through hole 102 defined in the shell 100 and receives the post 202 which has an end abutting against the bottom of the body 302. The flange 301 is stuck to the shell 100 using glue, to assemble the silicone member 300 to the shell as well as prevent water ingress. The switch 400 is positioned under the body 302. When the presskey 200 is pressed down, the post 202 presses the bottom of the body 302, the body 302 thus stretches and triggers the switch 400. When the presskey 200 is released, the body 302 restores the presskey 200. However, repeated use leads to failure of the glue between the silicone member 300 and the shell 100. As a result, the silicone member 300 breaks away from the shell 100, the waterproof presskey structure fails and the presskey 200 may fail as well. Furthermore, the thin bottom of the silicone member 300 provides little or no protection for the switch 400 when the presskey 200 is impacted, for example, during an accident such as the mobile phone being dropped. The presskey 200 fails if the switch 400 splits away or is damaged during such accidents. Third, being made of soft material, precise relative positioning of the silicone member 300 is difficult to achieve for even sticking to the shell 100 when the shell 100 is being assembled, which reduces the quality and productivity of the waterproof presskey structure.

SUMMARY OF THE INVENTION

A waterproof presskey structure is provided which is capable of avoiding presskey failure and waterproof failure resulting from the silicone member breaking away from the shell after repeated stretching during presskey presses.

A waterproof presskey structure includes a shell, a presskey, and an elastic member. The elastic member is adhesively attached to the shell, the presskey is movably assembled to the shell, wherein the elastic member includes a tubular structure formed with an elastic wall, the elastic wall is of an arched structure and protrudes towards the inside of the tubular structure to form the elastic member.

Preferably, a hole is defined in the shell, the tubular structure is press fitted into the hole.

A waterproof mobile phone is also provided. The above mentioned waterproof presskey structure is applied to the waterproof mobile phone to render it waterproof in the location of the waterproof presskey structure.

The waterproof presskey structure of the present disclosure improves upon the silicone member of related art by forming an elastic wall on the elastic member. When the presskey operates, the elastic wall of the elastic member can deform under force. The stretching of the elastic wall has limited affect due to the arched structure and a deformable length of the elastic wall. Thus the deformation of the elastic wall does not affect the seal or sealing between the elastic member and the shell, and thus presskey failure resulting from the elastic wall breaking away from the shell is reduced.

The two features of a deformation of an arched elastic wall to absorb external force exerted and the tubular structure being a press fit in the hole compare favourably with related art, which achieves waterproofing solely by depending on the pasting between the silicone member and the shell.

BRIEF DESCRIPTION OF THE DRAWINGS

Implementations of the present technology will now be described, by way of example only, with reference to the attached figures.

DETAILED DESCRIPTION

The present disclosure is made in conjunction with the accompanying drawings. Specific embodiments of the present disclosure are described to further illustrate a waterproof mobile phone with a waterproof presskey structure of the present disclosure.

Figure 2:
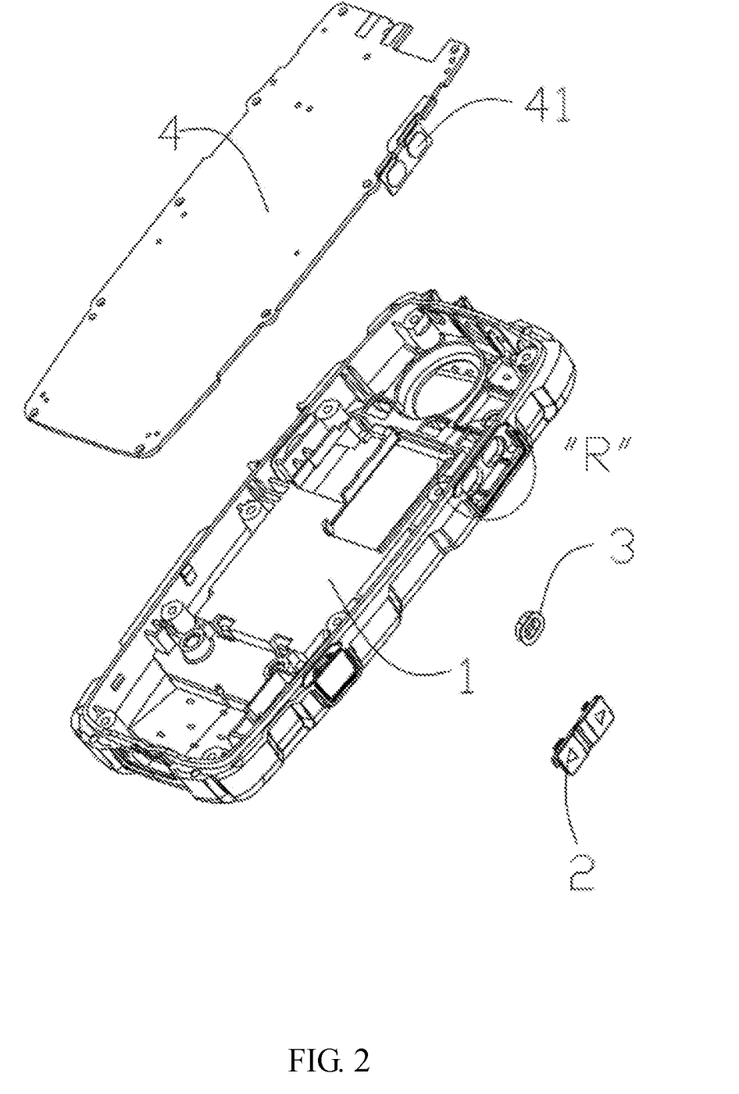
FIG. 2 is an exploded view of a waterproof mobile phone according to an embodiment of the present invention.
Figure 3:
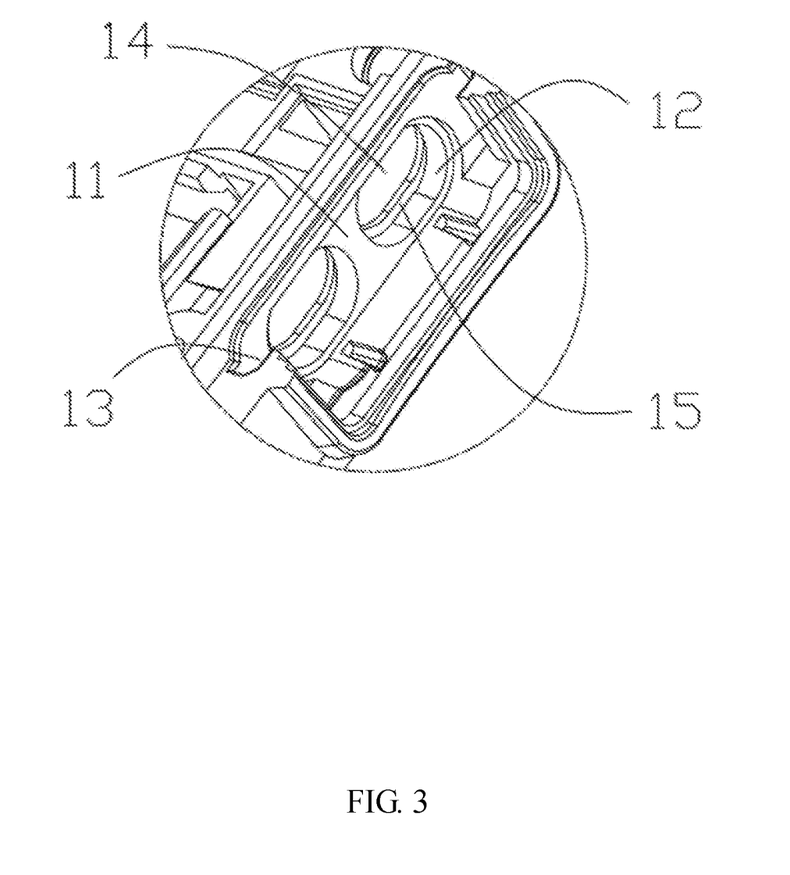
FIG. 3 is an enlarged view of portion "R" of FIG. 2.
Figure 4:
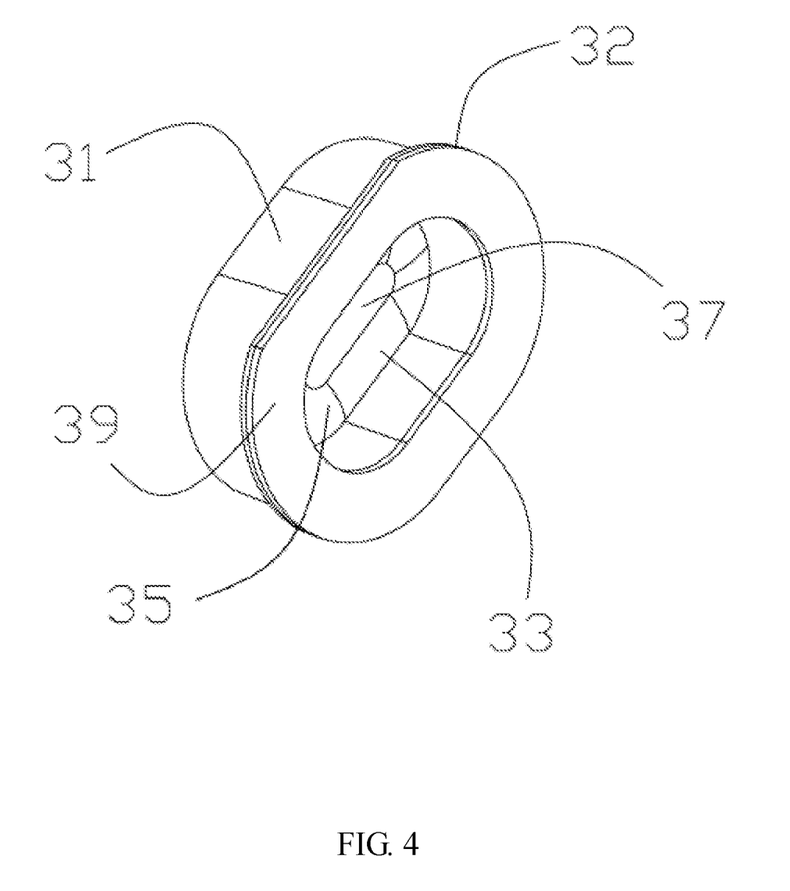
FIG. 4 is a schematic view of an elastic member of the waterproof mobile phone of FIG. 2.
Figure 5:
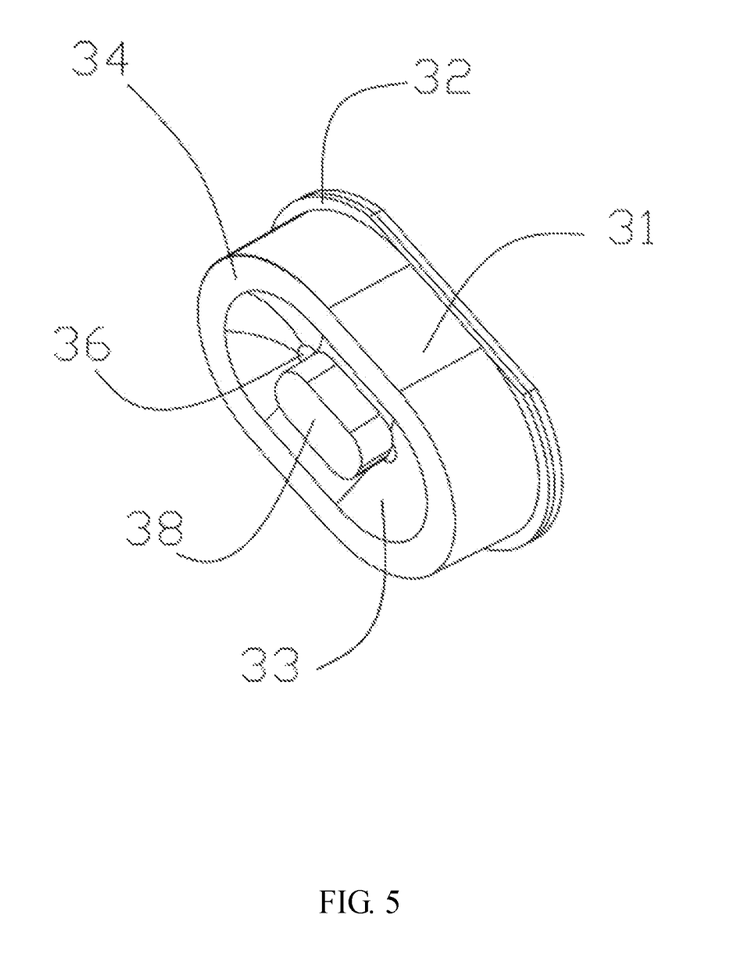
FIG. 5 is a schematic view of the elastic member of FIG. 4, viewed from another angle.

FIGS. 2-8 show a waterproof presskey structure of an outdoor mobile phone. FIG. 2 is an exploded view of the waterproof presskey structure. The waterproof presskey structure includes a shell 1, a presskey 2, an elastic member 3, and a circuit board assembly 4. Referring to FIGS. 4-5, the elastic member 3 includes a tubular structure 31 and a flange 32. The tubular structure 31 includes a bottom edge 34. An elastic wall 33 protrudes from the bottom edge 34 and towards the inside of the tubular structure 31. The elastic wall 33 is of an arched structure including an inner surface 35 and an outside surface 36 opposite the inner surface 35. A flat surface 37 is formed at the center of the inner surface 35. A post 38 is formed at the center of the outside surface 36.

Figure 7:
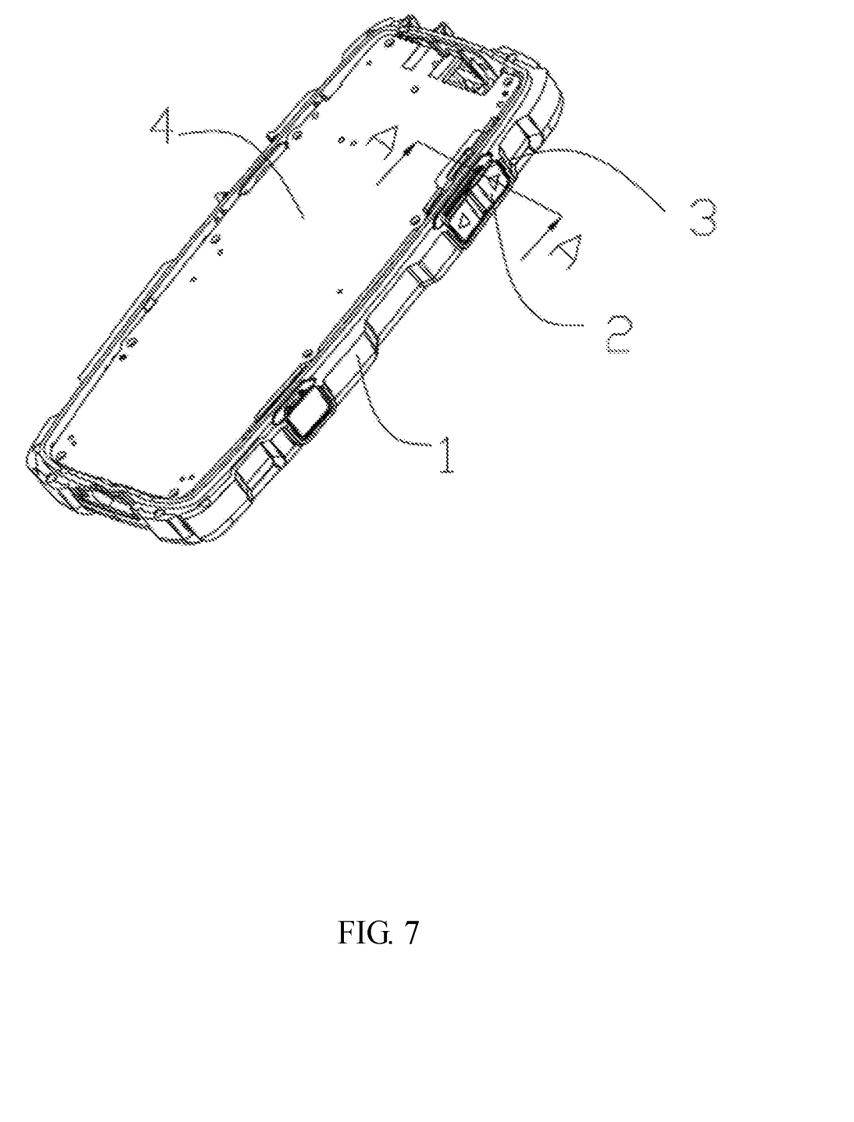
FIG. 7 is an assembled view of the waterproof mobile phone of FIG. 2.
Figure 8:
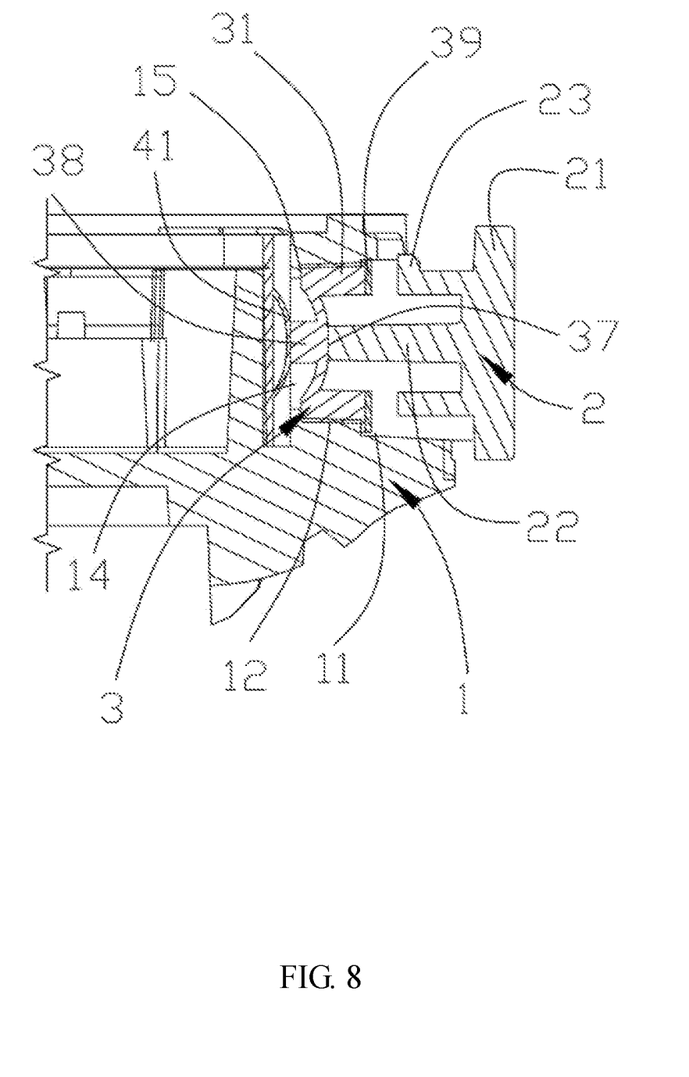
FIG. 8 is a cross sectional view taken along line "A-A" of FIG. 7.

Referring to FIGS. 3, 7, and 8, a groove 11 is defined in the shell 1, shaped in accordance with a shape of the flange 32. A hole 12 is defined on the bottom of the groove 11 for receiving the tubular structure 31 of the elastic member 3. In the embodiment, the tubular structure 31 is press fitted in the hole 12, and the flange 32 is assembled to the bottom of the groove 11, on the periphery of the hole 12.

Figure 6:
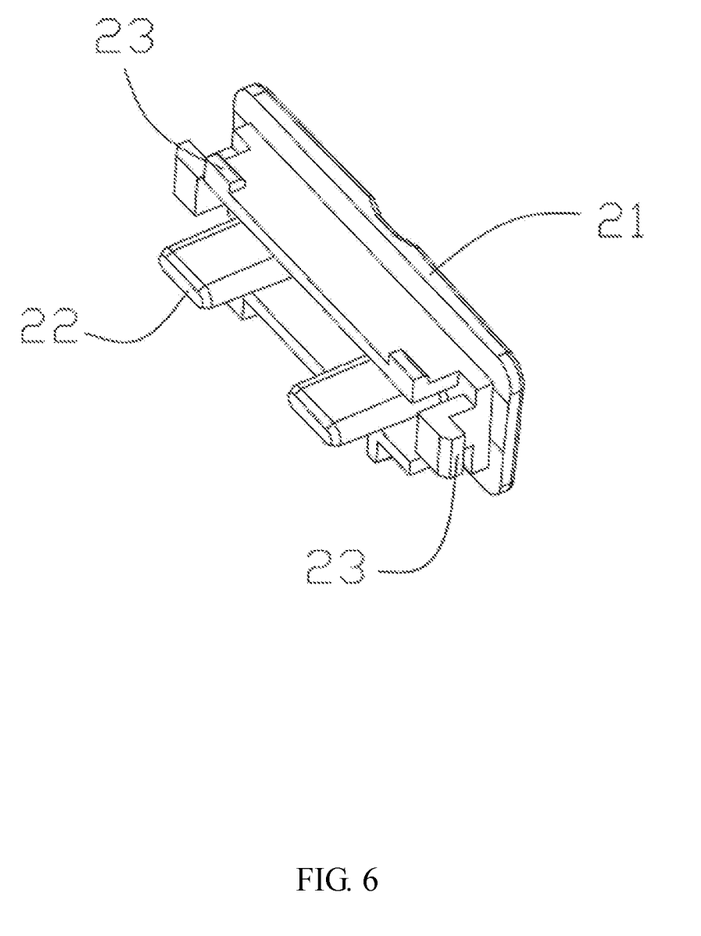
FIG. 6 is a schematic view of a presskey of the waterproof mobile phone of FIG. 2.

Referring to FIGS. 6-8, the presskey 2 includes a key cap 21, and a bulge 22 extending from the key cap 21. The presskey 2 is formed with one or more hooks 23. The shell 1 defines the same number of slots 13 as that of the hooks 23. The hooks 23 are received in the corresponding slots 13, and are moveable in the slots 23 along the direction of pressing/releasing the key cap 21. The presskey 2 is able to move a distance when the key cap 21 is either pressed or released. The bulge 22 is received in the tubular structure 31, with its end abutting against the flat surface 37 of the elastic member 3. Meanwhile, a through hole 14 is defined on the bottom of the hole 12, the through hole 14 is smaller in diameter than the hole 12. The through hole 14 and the hole 12 are coaxial, with a step 15 formed between them. The step 15 supports the bottom edge 34 of the tubular structure 31, and the through hole 14 faces the outside surface 36 of the elastic wall 33.

Referring to FIGS. 2, 7, and 8, the circuit board assembly 4 is connected to a switch 41. The switch 41 is assembled on the shell 1 and faces the through hole 14. The post 38 abuts against the switch 41 via the through hole 14. When the presskey 2 is pressed, the force exerted on the key cap 21 is conducted to the elastic wall 33 via the bulge 22 and deforms the elastic wall 33. The post 38 formed on the elastic wall 33 moves towards the switch 41. The force exerted on the key cap 21 is passed to the switch 41 via the post 38 and triggers the switch 41.

Gum or other adhesive material is applied between the flange 32 and the bottom of the groove 11 to paste the flange 32 and the bottom of the groove 11 together, which improves water resistance of the waterproof presskey structure.

The tubular structure 31 is press fitted in the hole 12 and the length of the tubular structure 31 allows for a larger deformable length, such that water resistance of the waterproof presskey structure is increased. Therefore, waterproofing of the waterproof presskey structure can be achieved without gum or other adhesive material applied to paste the flange 32 and the bottom of the groove 11 together.

In the embodiment, the flange 32 is formed with a PET layer 39. Since the PET layer 39 is rigid, the PET layer 39 pulls the tubular structure 31 and reduces the total deforming of the tubular structure 31 when the tubular structure 31 is press-fitted in the hole 12 and deforms inwardly under the press of the wall of the hole 12. This maintains the integrity of the press-fitted assembly of the tubular structure 31 and the hole 12. Furthermore, the PET layer 39 is also helpful for positioning the elastic member 3 and therefore helpful for ease of productivity when assembling the elastic member 3 to the shell 1. In another embodiment, the PET layer 39 can be replaced by another rigid layer such as a metal layer or a PC layer.

As compared to the related art, the elastic member 3 is more enduring, and unlikely to split away off the shell 1. The elastic wall 33 is of an arched structure and has a deformable length, only the elastic wall 33 deforms and allows the post 38 to move down to trigger the switch 41 when the presskey 2 is pressed. The force exerted on the tubular structure 31 by the elastic wall is not great, therefore repeatedly pressing the presskey 2 does not destabilize the assembly of the elastic member 3 to the shell 1. Furthermore, the step 15 between the holes 12 and 14 supports the tubular structure 31. All those ways provided above make it possible that only the elastic wall 33 deforms when being pressed by the presskey 2, the assembly is not affected and the tubular structure 31 does not break away from the shell 1, even after long repeated use.

The waterproofing of the waterproof presskey structure is achieved by press-fitting the tubular structure 31 in the hole 12 of the shell 1. The existence of the flat surface 37 ensures that the force pressing on the key cap 21 can be uniformly conducted to the post 38, and finally exerted on the switch 41. The post 38 provides good feeling for users when operating the presskey 2. Furthermore, the post 38 protects the switch 41 when the presskey 2 is impacted, for example, during an accident such as the waterproof mobile phone being dropped. The switch 41 does not break away from the circuit board assembly 4 and works all the time.

Problems of presskey failure and waterproof failure in related art, which result from the silicone member breaking away from the shell after repeated stretching during presskey pressing, are avoided. The waterproofing presskey structure of the present invention provides an elastic member formed with an elastic wall at the bottom. The elastic wall is of an arched structure and has a deformable length to allow the elastic wall to stretch until the switch is triggered. Meanwhile, the tubular structure is press fitted in the shell for waterproofing, the flange of the elastic member is formed with a hard and rigid layer to facilitate and stabilize the assembly of the elastic member to the shell. Furthermore, the elastic member is formed with a post. Altering the thickness of the post can provide a good feeling for users during operation and protect the switch from shock.

The embodiments shown and described above are only examples. Even though numerous characteristics and advantages of the present technology have been set forth in the foregoing description, together with details of the structure and function of the present disclosure, the disclosure is illustrative only, and changes can be made in the detail, including in matters of shape, size, and arrangement of the parts within the principles of the present disclosure, up to and including the full extent established by the broad general meaning of the terms used in the claims.

What is claimed is:

1. A waterproof presskey structure comprising a shell, a presskey and an elastic member, the elastic member being adhesively attached to the shell, the presskey movably assembled to the shell and engaged with the elastic member, wherein: the elastic member comprises a tubular structure formed with an elastic wall, the elastic wall is of an arched structure and protrudes towards inside of the tubular structure to form the elastic member, wherein the elastic member further comprises a flange formed with a rigid layer, a groove is defined in the shell and shaped in accordance with a shape of the flange, the groove has a bottom defining a hole, the tubular structure is assembled in the hole and the flange is supported by the groove.

2. The waterproof presskey structure as claimed in claim 1, wherein the tubular structure comprises a bottom edge formed with the elastic wall.

3. The waterproof presskey structure as claimed in claim 2, wherein the elastic wall comprises an inner surface and an outside surface, a flat surface is formed at the center of the inner surface and a post is formed at the center of the outside surface.

4. The waterproof presskey structure as claimed in claim 3, wherein the presskey comprises a bulge, the presskey is movably assembled to the shell, and the bulge is assembled in the tubular structure and abuts against the flat surface.

5. The waterproof presskey structure as claimed in claim 4, wherein the hole has a bottom, the center of the bottom is defined with a through hole, a step is formed between the hole and the through hole, the through hole faces the post, and the step supports the bottom of the tubular structure.

6. The waterproof presskey structure as claimed in claim 5, wherein glue is applied between the flange and the bottom of the groove to assemble the flange to the shell in a pasting manner.

7. The waterproof presskey structure as claimed in claim 6, wherein the elastic member is made of silicone, and the rigid layer is made of PC, PET or metal.

8. A waterproof presskey structure, comprising a shell, a presskey and an elastic member, the presskey movably assembled to the shell, wherein: the elastic member comprises a tubular structure formed with an elastic wall, the elastic wall is of an arched structure and protrudes towards inside of the tubular structure, a hole is defined in the shell, the tubular structure is press fitted in the hole, wherein the elastic member comprises a flange formed with a rigid layer, a groove is defined in the shell and shaped in accordance with a shape of the flange, the groove has a bottom defining the hole, and the flange is supported by the groove.

9. The waterproof presskey structure as claimed in claim 8, wherein the tubular structure comprises a bottom edge formed with the elastic wall.

10. The waterproof presskey structure as claimed in claim 9, wherein the elastic wall comprises an inner surface and an outside surface, a flat surface is formed at the center of the inner surface and a post is formed at the center of the outside surface, the presskey comprises a bulge abutting against the flat surface.

11. The waterproof presskey structure as claimed in claim 10, wherein the hole has a bottom, the center of the bottom is defined with a through hole, a step is formed between the hole and the through hole, the through hole faces the post, and the step supports the bottom of the tubular structure.

12. A waterproof mobile phone, comprising a waterproof presskey structure, wherein the waterproof presskey structure comprises a shell, a presskey and an elastic member, the elastic member is adhesively attached to the shell, the presskey is movably assembled to the shell and engaged with the elastic member, the elastic member comprises a tubular structure formed with an elastic wall, the elastic wall is of an arched structure and protrudes towards inside of the tubular structure to form the elastic member, wherein the elastic member further comprises a flange formed with a rigid layer, a groove is defined in the shell and shaped in accordance with a shape of the flange, the groove has a bottom defining a hole, the tubular structure is assembled in the hole and the flange is supported by the groove.

13. The waterproof mobile phone as claimed in claim 12, wherein the tubular structure comprises a bottom edge formed with the elastic wall.

14. The waterproof mobile phone as claimed in claim 13, wherein the elastic wall comprises an inner surface and an outside surface, a flat surface is formed at the center of the inner surface and a post is formed at the center of the outside surface.

15. The waterproof mobile phone as claimed in claim 14, wherein the presskey comprises a bulge, the presskey is movably assembled to the shell, and the bulge is assembled in the tubular structure and abuts against the flat surface.

16. The waterproof mobile phone as claimed in claim 15, wherein the hole has a bottom, the center of the bottom is defined with a through hole, a step is formed between the hole and the through hole, the through hole faces the post, and the step supports the bottom of the tubular structure.

17. The waterproof mobile phone as claimed in claim 16, wherein glue is applied between the flange and the bottom of the groove to assemble the flange to the shell in a pasting manner.

18. The waterproof mobile phone as claimed in claim 17, wherein the elastic member is made of silicone, and the rigid layer is made of PC, PET or metal.

19. A waterproof mobile phone comprising a waterproof presskey structure, wherein the waterproof presskey structure comprises a shell, a presskey and an elastic member, the presskey is movably assembled to the shell, the elastic member comprises a tubular structure formed with an elastic wall, the elastic wall is of an arched structure and protrudes towards inside of the tubular structure, a hole is defined in the shell, the tubular structure is press fitted in the hole, wherein the elastic member comprises a flange formed with a rigid layer, a groove is defined in the shell and shaped in accordance with a shape of the flange, the groove has a bottom defining the hole, and the flange is supported by the groove.

20. The waterproof mobile phone as claimed in claim 19, wherein the tubular structure comprises a bottom edge formed with the elastic wall.

21. The waterproof mobile phone as claimed in claim 20, wherein the elastic wall comprises an inner surface and an outside surface, a flat surface is formed at the center of the inner surface and a post is formed at the center of the outside surface, the presskey comprises a bulge abutting against the flat surface.

22. The waterproof mobile phone as claimed in claim 21, wherein the hole has a bottom, the center of the bottom is defined with a through hole, a step is formed between the hole and the through hole, the through hole faces the post, and the step supports the bottom of the tubular structure.

* * * * *